United States Patent [19]
Hatch et al.

[11] Patent Number: 5,928,512
[45] Date of Patent: Jul. 27, 1999

[54] DEMOUNTABLE FILTER FOR A BOTTLE OR THE LIKE

[75] Inventors: Gary L. Hatch; Robert S. Frank, both of Sheboygan, Wis.

[73] Assignee: Plymouth Products, Inc., Sheboygan, Wis.

[21] Appl. No.: 08/626,823

[22] Filed: Apr. 3, 1996

[51] Int. Cl.$^6$ .................................................. C02F 1/28
[52] U.S. Cl. .................... 210/266; 210/282; 210/436; 210/429; 210/472; 210/474; 210/469; 210/455; 210/457
[58] Field of Search ................... 210/282, 266, 210/472, 464, 466, 468, 469, 474, 475, 455, 457, 429, 436; 222/189

[56] References Cited

U.S. PATENT DOCUMENTS

| | | | |
|---|---|---|---|
| 98,343 | 12/1869 | Boyce | 210/472 |
| 626,238 | 6/1899 | Knapp | 210/467 |
| 647,580 | 4/1900 | Parker | 210/472 |
| 690,457 | 1/1902 | Parker | 210/472 |
| 707,873 | 8/1902 | Spencer | 210/282 |
| 872,407 | 12/1907 | Donahoe | 210/467 |
| 1,090,283 | 3/1914 | Crandall | 210/282 |
| 1,205,743 | 11/1916 | Hoke | 210/232 |
| 1,292,737 | 1/1919 | Endreson | 210/472 |
| 2,055,096 | 9/1936 | Dehn et al. | 210/472 |
| 2,212,318 | 8/1940 | Gee | 210/472 |
| 2,389,185 | 11/1945 | Dick | 210/472 |
| 2,761,833 | 9/1956 | Ward | 210/282 |
| 2,781,312 | 2/1957 | Klumb et al. | 210/282 |
| 2,869,724 | 1/1959 | McDevitt | 210/282 |
| 3,038,610 | 6/1962 | Hetherington | 210/282 |
| 3,220,555 | 11/1965 | Silha | 210/282 |
| 3,335,917 | 8/1967 | Knight | 210/282 |
| 3,449,081 | 6/1969 | Hughes | 210/282 |
| 3,782,549 | 1/1974 | Muller | 210/282 |
| 3,951,798 | 4/1976 | Haldopoulos | 210/282 |
| 4,181,243 | 1/1980 | Frahm | 210/282 |
| 4,605,499 | 8/1986 | Wise | 210/282 |
| 4,695,379 | 9/1987 | Nohren, Jr. et al. | 210/282 |
| 4,714,550 | 12/1987 | Malson et al. | 210/282 |
| 4,753,728 | 6/1988 | Vanderbilt et al. | 210/282 |
| 4,769,144 | 9/1988 | Nohren, Jr. | 210/282 |
| 4,800,018 | 1/1989 | Moser | 210/266 |
| 4,852,781 | 8/1989 | Shurnick et al. | 224/148 |
| 4,979,654 | 12/1990 | Nohren, Jr. | 222/482 |
| 4,986,901 | 1/1991 | Nohren, Jr. et al. | 210/85 |
| 4,995,976 | 2/1991 | Vermes et al. | 210/266 |
| 5,013,459 | 5/1991 | Gettings et al. | 210/764 |
| 5,045,195 | 9/1991 | Spangrud et al. | 210/266 |
| 5,122,272 | 6/1992 | Iana et al. | 210/282 |
| 5,126,044 | 6/1992 | Magnusson et al. | 210/282 |
| 5,167,819 | 12/1992 | Iana et al. | 210/282 |
| 5,211,973 | 5/1993 | Nohren, Jr. | 426/82 |
| 5,252,206 | 10/1993 | Gonzalez | 210/282 |
| 5,273,649 | 12/1993 | Magnusson et al. | 210/232 |
| 5,290,457 | 3/1994 | Karbachsch et al. | 210/232 |
| 5,328,609 | 7/1994 | Magnusson et al. | 210/314 |
| 5,417,860 | 5/1995 | Kay | 210/472 |
| 5,431,813 | 7/1995 | Daniels | 210/282 |
| 5,496,471 | 3/1996 | Heyl | 210/266 |
| 5,509,605 | 4/1996 | Cripe | 239/33 |
| 5,545,315 | 8/1996 | Lonneman | 210/120 |
| 5,609,759 | 3/1997 | Nohren, Jr. et al. | 210/266 |
| 5,616,242 | 4/1997 | Mandola | 210/474 |
| 5,635,079 | 6/1997 | Becking, II | 210/767 |
| 5,653,878 | 8/1997 | Reid | 210/266 |

*Primary Examiner*—Cynthia L. Nessler
*Attorney, Agent, or Firm*—Andrus, Sceales, Starke & Sawall

[57] ABSTRACT

A small filter cartridge is particularly adapted to be attached to the neck of a conventional plastic soft drink bottle to filter contaminated water contained in the bottle by passing the water through the filter as it is discharged from the bottle. The flexible bottle walls are squeezed to pressurize the water and facilitate flow through the filter element. The filter includes a uniquely positioned check valve which allows pressure equalization of the bottle interior in a simple and efficient manner. The filter is attached directly to the neck of the bottle and embodiments are disclosed in which the element is inserted completely within the bottle and mounted entirely outside the bottle.

3 Claims, 1 Drawing Sheet

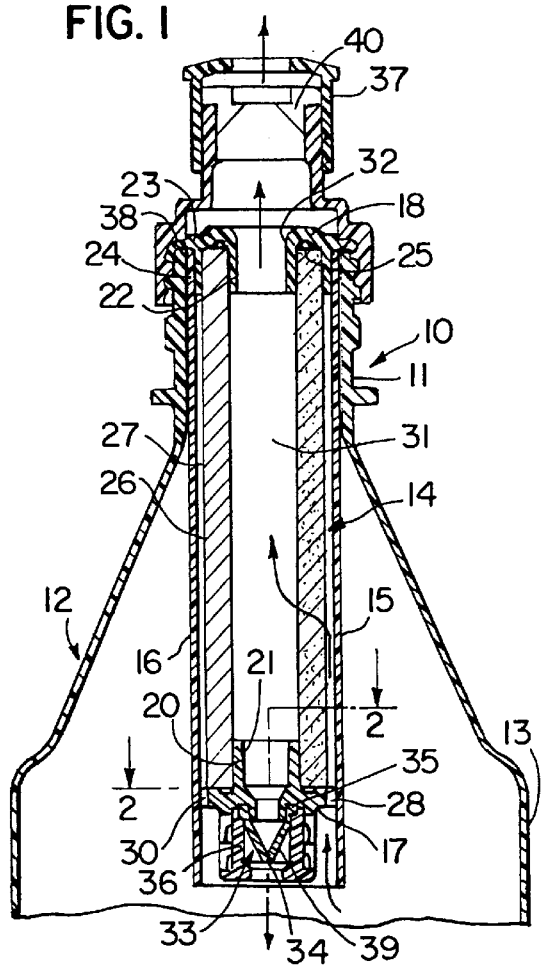
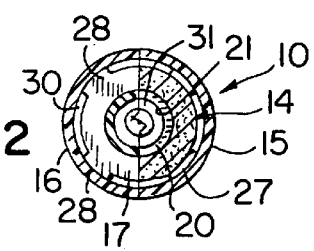
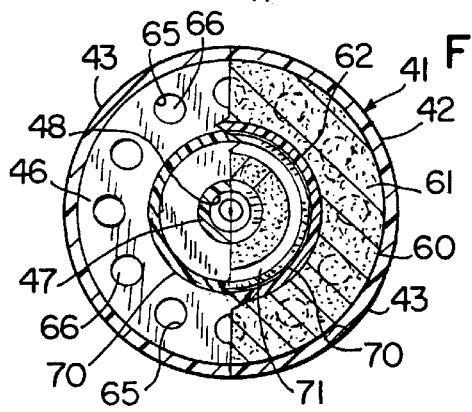
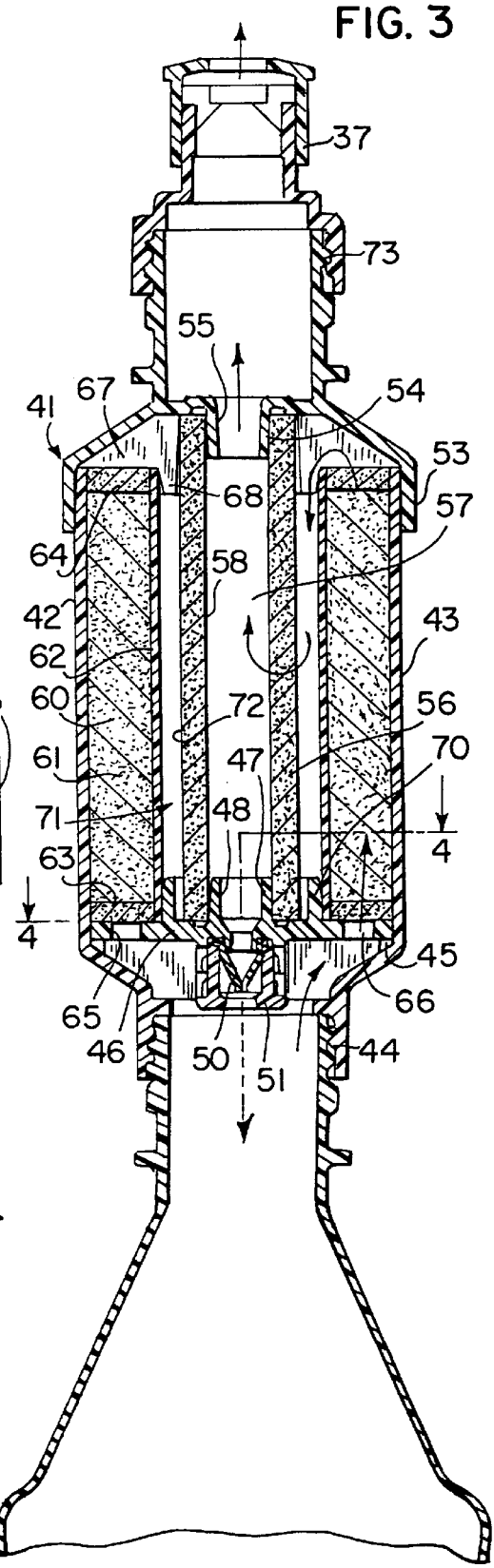

DEMOUNTABLE FILTER FOR A BOTTLE OR THE LIKE

BACKGROUND OF THE INVENTION

The present invention relates to a filter apparatus for removing contaminants from water and, more particularly, to a small demountable filter unit which can be attached to a flexible plastic bottle to filter contaminated water contained in and dispensed from the bottle.

It is known in the art to provide removable and replaceable filter cartridges which may be demountably attached to the neck of a rigid-walled container (such as a canteen) to filter contaminated water dispensed from the container. U.S. Pat. No. 3,335,917 shows a filter element which is inserted into the container and attached to the neck thereof. Water flows through the filter cartridge by gravity and the cartridge includes a concentric air pressure equalization passage extending between the outer attachment cap and the bottom of the filter element.

U.S. Pat. Nos. 5,122,272 and 5,167,819 also show filter cartridges inserted into a canteen-like container and attached to the neck thereof. The filter cartridge includes an integral outwardly extending straw allowing the user to withdraw water through the filter cartridge by suction. A pressure equalization passage is also provided through the outer closure cap and neck of the canteen.

U.S. Pat. No. 5,126,044 shows a filter cartridge which may be threadably attached to the neck of a bottle and mounted externally thereof. This patent teaches that the gravity flow of contaminated water from the inverted bottle through the filter cartridge may be supplemented by providing the bottle with flexible walls and squeezing the same. However, no means for equalizing the negative pressure inside the dispensing bottle is described, apart from allowing external atmospheric pressure to force air in a reverse direction through the filter element. U.S. Pat. No. 4,714,550 shows an internally mounted canteen filter cartridge in which contaminated water in the canteen may be dispensed through the filter under the combined influence of an integral drinking straw and a separate manually operated pump to pressurize the interior.

Other dispensing filters utilizing gravity flow are shown in U.S. Pat. Nos. 4,181,243 and 4,605,499.

A canteen filter or bottle filter of the types described above, if operated by simple gravity flow, requires the use of a very porous filter media or loose packed granular bed. As a consequence, contaminant removal is typically compromised. On the other hand, when such filters function with the use of internal pressurization of the container, a more densely packed and more efficient filter media may be utilized. However, such constructions tend to be more complex and, in particular, require a more sophisticated venting arrangement for equalizing the inherent pressure differential which develops between the interior of the container and the outside atmosphere during dispensing.

SUMMARY OF THE INVENTION

In accordance with the present invention, a small demountable filter is attached to the neck of a bottle to filter the contents of contaminated water in the bottle as it is dispensed therefrom for drinking or other use. The filter is particularly suited for use with a conventional PET plastic water or soft drink bottle, the inherent flexibility of the walls of which permits the user to pressurize the bottle by squeezing and force the water through the filter for discharge.

The filter includes a housing which has an enclosing outer wall, a raw water inlet on one end, and a filtered water outlet on the other end. In the preferred embodiment, the inlet and outlet ends of the housing are defined by respective inlet and outlet end pieces between which is mounted a cylindrical tubular carbon block filter element supported to extend axially between the end pieces. The cylindrical filter element has an outer face which is spaced from the housing side wall and defines therewith an inlet flow distribution chamber. The tubular filter element also has an inner face which defines an outlet flow distribution chamber. Inlet means are disposed in the inlet end piece for directing water contained in the bottle into the inlet flow distribution chamber. Outlet means are provided in the outlet end piece for dispensing water from the outlet flow distribution chamber. A check valve, preferably mounted in the inlet end piece, provides communication between the bottle interior and the outlet flow distribution chamber in the filter element, the check valve being operative to close in response to pressurization to prevent a short-circuiting flow of water through it and to open in response to release of pressurization to permit a flow of pressure equalizing outside air into the bottle interior. Means are provided for demountably attaching the housing to the neck of the bottle. Preferably, the inside of the tubular filter element, defining the inner face, is cylindrical and each of the inlet and outlet end pieces includes an annular sleeve which extends axially into an end of the inner face of the filter element to hold and position the element concentrically within the housing.

In a presently preferred embodiment, the outer wall of the filter housing comprises a cylindrical tube which is sized to be inserted into the open end of the bottle neck. The tube includes a radial peripheral flange on the outlet end piece adapted to rest on the bottle neck when the filter housing is inserted therein. A demountable closure cap is provided to sealingly engage the bottle neck and to capture the peripheral flange of the outlet end piece therebetween.

In another embodiment, the filter medium includes a bed of particulate material which is confined between the outer housing wall and an inner wall concentric with and spaced radially inwardly of said outer wall. The particulate bed is confined axially by a solid porous inlet retainer on the inlet end and a similar porous intermediate retainer positioned in a bed outlet at the opposite axial end thereof, the porous retainers defining the opposite ends of an axial flow path through the bed of particulate material. This embodiment may also include a porous tubular carbon block of the type utilized in the preferred embodiment. The carbon block is mounted concentric with and spaced radially inwardly of the inner confining wall of the particulate material bed and defines therewith a flow distribution chamber which has a chamber inlet on one axial end in communication with the flow from the intermediate retainer. The distribution chamber also defines the upstream end of a radial flow path through the carbon block. In this embodiment, the means for attaching the filter to the bottle includes threaded connector means on the housing inlet for attachment to the neck of the bottle to mount the housing externally thereof. The filter also includes a demountable closure cap on the outlet from the housing.

BRIEF DESCRIPTION OF THE DRAWINGS

FIG. 1 is a vertical section through one embodiment of the filter of the present invention shown attached to the neck of a bottle.

FIG. 2 is a horizontal section taken on line 2—2 of FIG. 1.

FIG. 3 is a vertical section through an alternate embodiment of the filter of the present invention, also shown attached to the neck of a bottle.

FIG. 4 is a horizontal section taken on line 4—4 of FIG. 3.

DETAILED DESCRIPTION OF THE PREFERRED EMBODIMENTS

Referring to FIGS. 1 and 2, one embodiment of a filter 10 of the present invention is shown mounted on the neck 11 of a plastic bottle 12 of the type commonly used for water and soft drinks. Such bottles are typically blow molded of PET or other suitable plastics and include a thin flexible wall 13. The filter 10 of this embodiment, as well as the filter shown in FIGS. 3 and 4, is particularly adapted to filter the contaminants from water stored in the bottle as it is dispensed therefrom. The water may be contaminated or of questionable potability for any number of reasons and, as a result, the filter media to be described may vary accordingly.

In this embodiment, however, the filter medium preferably comprises a porous tubular cylindrical block of activated carbon particles of a type known and commonly used in the prior art. The manner in which the filter element 14 is mounted and interacts with other parts of the filter 10 makes its use particularly attractive for removing a wide range of undesirable and potentially hazardous contaminants from water of known unsuitability or questionable quality. For example, an activated carbon block filter element can be used to remove chlorine, as well as other contaminants adversely affecting taste, suspended particulates to reduce turbidity, certain toxic heavy metals, and certain bacterial and protozoan cysts.

The filter 10 includes a housing 15 defined by an enclosing outer wall 16, an inlet end piece 17 on one axial end of the outer wall and an outlet end piece 18 on the other axial end. The inlet end piece 17 is disposed entirely within the open inlet end of the cylindrical housing 15 and includes an annular mounting sleeve 20 which extends axially into the housing and defines an open central air passage 21 (the function of which will be described in greater detail hereinafter). The outlet end piece 18 is mounted on the outlet end of the housing 15 and includes an annular mounting sleeve 22 extending axially into the housing and aligned with the mounting sleeve 20 on the opposite inlet end piece 17.

The outer wall 16 of the filter housing 15 is preferably cylindrical in shape and has a diameter just slightly smaller than the ID of the bottle neck 11 so that the entire filter 10 may be inserted into the open bottle 12, except for a radial peripheral flange 23 on the outlet end piece by which the filter is supported on the end of the neck of the bottle. The outlet end piece 18 also includes an axially extending outer annular sleeve 24 having an outer diameter sized to fit tightly within the open outlet end of the housing wall 16. The annular mounting sleeve 22 and outer annular sleeve 24 define therebetween an annular recess 25 into which the outlet end of the porous carbon filter element 14 is received. The opposite inlet end of the element 14 fits over the outside of the annular mounting sleeve 20 of the inlet end piece 17, all as shown in FIG. 1.

The filter element 14 has a cylindrical outer surface 26 smaller in diameter than the inside diameter of the housing wall 16 to define therewith an annular inlet flow distribution chamber 27 extending essentially the full length of the filter element 14. The inlet end piece 17 is provided with a number of circumferentially spaced peripheral centering tabs 28 which define with the inside of the housing wall 16 a number of inlet openings 30 through which water contained in the bottle 12 may pass into the inlet flow distribution chamber 27 and then radially inwardly through the filter element 14 into the open interior thereof which defines an outlet flow distribution chamber 31 for the filtered water. From the outlet flow distribution chamber 31, the filtered water passes axially through a central outlet opening 32 defined by the annular mounting sleeve 20 in the outlet end piece 18.

The construction of the carbon block filter element 14 necessarily represents a compromise to accommodate the competing interests of low resistance to flow provided by a more highly porous filter media and the high contaminant removal capability provided by a tighter and lower porosity filter element. It is well known to utilize a pressurized flow of raw or contaminated water through a filter element to increase flow while maintaining lower porosity and higher removal capability. Thus, flow through the filter 10 of the present invention is enabled by squeezing the flexible side wall 13 of the bottle 12, thereby pressurizing the water contained therein and forcing it through the inlet openings 30 and the filter path previously described. As is well known, a certain portion of the air volume inside the bottle is also expelled with the water upon squeezing and outside air must be allowed to enter the bottle when the squeezing pressure is released or else subsequent pressurization will be seriously inhibited or ineffective. The filter of the present invention utilizes a unique check valve arrangement to accommodate pressure equalization in a simple and effective manner.

A check valve 33 is attached to the underside of the inlet end piece 17 and surrounds the central air passage 21 therein. The check valve 33 preferably includes a flexible rubber body 39 which is V-shaped in the section shown in FIG. 1 and defines a longitudinal slit 34 in its free end. This check valve construction is known per se and is commonly referred to as a "duck bill" check valve. The valve includes an upper end flange 35 which is captured and held in an annular groove in the inlet end piece by an enclosing valve cage 36. When the bottle wall 13 is squeezed to dispense the water through the filter, the outer surface of the check valve 33 is pressurized to hold the slit 34 closed. The water flows only through the peripheral inlet openings 30 in the inlet end piece 17, through the filter as described, and out of the filter via the outlet opening 32. When the dispensing pressure on the bottle is released, higher pressure outside air is forced in the reverse direction (shown by the dashed line arrow) through the outlet opening 32 along the outlet flow distribution chamber 31 in the filter element, through the central air passage 21 and the slit 34 in the check valve. It is important that the check valve 33 be constructed so that the initial pressure required to open the valve, as dispensing pressure is released and outside air is allowed to flow into the filter (this initial pressure sometimes referred to as "cracking pressure") is less than the pressure required to allow air to pass in a reverse direction through the filter media. This assures that the repressurization air is drawn back through the check valve rather than through the filter media. This is a particularly important concern when utilizing a filter which incorporates a granular media, such as an iodine resin comprising the media bed 61 in the embodiment to be described with respect to FIGS. 3 and 4. If the cracking pressure of the check valve is not less than the backflow pressure of the media bed (sometimes referred to as "bubble point pressure"), reverse air flow through the bed may result in undesirable channeling and the formation of air pockets in the resin media bed. The bottle may be held for dispensing in any attitude that permits the water to cover the open inlet end of the housing 15.

The filter 10 is secured in place on the bottle 12 with a threaded end cap 37 provided with an internal thread pattern matching the outer thread pattern on the bottle neck 11. The end cap includes an interior shoulder 38 which, when the cap is threaded on the neck, captures the peripheral flange 13 of the outlet end piece 18 to hold the filter in place and seal the interface between the interengaging parts. An appropriate sealing washer may also be used. The end cap 37 is preferably of the type which includes an integral open-closed slide valve 40 of any of several well known constructions.

Although practical size limitations restrict the volume of filter media which might be used in the filter 10 which is inserted into the bottle, this filter may be utilized in conjunction with certain well known disinfecting devices which may be dropped into the water in the bottle before the filter is attached. For example, disinfecting tablets, microbicidal iodine or other iodinated or brominated resins contained in a porous tea bag or the like, or other types of treatment materials may be used. In this case, the overall capability of the contaminant removal system may be significantly enhanced and possible detrimental side effects, such as characteristic iodine taste, can be effectively eliminated by subsequent passage of the water through the carbon block filter element 14.

FIGS. 3 and 4 show another embodiment of a filter 41 in accordance with the subject invention. This filter includes a substantially enlarged housing 42 which utilizes a larger volume of filter medium or separate serially arranged media of different types for enhanced filtering and contaminant removal. The large volume of the housing 42 is accommodated by mounting the filter 41 outside the bottle 12 on the neck 11 thereof. The housing 42 includes a cylindrical outer wall 43, one end of which tapers to define an internally threaded inlet end sleeve 44 for direct attachment to the neck of a bottle. Disposed within the lower part of the housing 42 is an inlet end piece 46 which is supported by its peripheral edge on a circumferential rib 45 on the inside of the housing outer wall 43. The inlet end piece 46 includes a central annular mounting sleeve 47 defining an air passage 48. Attached to the opposite face of the inlet end piece 47 and centered on the air passage 48 is a check valve 50 and valve mounting cage 51, in all respects structurally and functionally the same as the check valve and cage described with respect to the embodiment of FIGS. 1 and 2.

An opposite outlet end piece 52 closes the other end of the filter housing 42. Outlet end piece 52 is made separately from the cylindrical housing wall 43 and includes an outer attachment flange 53 adapted to slip over the upper end of the cylindrical outer wall 43 and to be sealingly secured thereto after the filter element or elements (to be described) have been inserted in the housing. The outlet end piece 52 includes a downwardly depending annular mounting sleeve 54 which defines a central outlet opening 55.

The outside diameters of the respective inlet end and outlet end annular mounting sleeves are the same, and are equal to the ID of a cylindrical tubular carbon block filter element 56. The filter element 56 may be identical to the element 14 of the previously described embodiment, but may also comprise a carbon element of different porosity or of an entirely different porous filter medium. For example, a pleated paper filter element might be utilized. The tubular cylindrical element 56 is held and maintained in place by the annular mounting sleeves 47 and 54 extending into the opposite ends. The filtered water flow path extends from an outlet flow distribution chamber 57, defined by the cylindrical inner face 58 of the filter element through the outlet opening 55 in the outlet end piece 52.

The filter 41 includes a prefilter element 60 which consists primarily of a particulate media bed 61 surrounding the central filter element 56. The particulate media bed 61 is also of a cylindrical tubular shape with the bed contained between the cylindrical outer wall 42 of the housing and a tubular intermediate wall 62 disposed concentrically with and between the outer wall 43 and the filter element 56. The loose particulate media is confined within its tubular chamber by an inlet prefilter disk 63 and an outlet post-filter disk 64. The filter disks 63 and 64 may be of a conventional rigid sintered polypropylene or any other suitable material. The inlet prefilter disk 63 sits atop the radial outer surface of the inlet end piece 46 and in direct flow communication with a circumferential array of holes 65 defining inlet openings 66 to the prefilter element 60. The outer and inner edges of the prefilter disk 63 also snugly engage the respective abutting faces of the housing wall 43 and the intermediate wall 62. The outlet prefilter disk 64 on the opposite end of the media bed 61 may be of identical construction and is held in place by a series of circumferentially spaced gussets 67 formed integrally with the inner surface of the outlet end piece 52. The gussets 67 include axially extending end tabs 68 which serve to capture and hold the cylindrical intermediate wall 62 which confines the media bed 61. Similarly, the opposite axial end of the intermediate wall 62 is confined and held in position by contact with the outer surface of an intermediate annular sleeve 70 formed on the inlet end piece 46.

In operation, pressurization of the water in the bottle 12 by squeezing the flexible side wall 13, forces the water to flow through the inlet openings 66 in the inlet end piece and the inlet prefilter disk 63, axially through the particular media bed 61 and through the outlet prefilter disk 64. The prefiltered flow continues past the gussets and in a reverse axial direction into an intermediate flow distribution chamber 71. Chamber 71 is defined by the inside face of the intermediate wall 62 and the cylindrical outer surface 72 of the filter element 56. From the intermediate chamber 71, the path of flow of prefiltered water is radially through the filter element 56 and into the outlet flow distribution chamber 57, from which it exits the filter via the outlet opening 55. An outlet end cap 37, identical to that described with respect to the embodiment of FIGS. 1 and 2, is demountably attached to a threaded outlet sleeve 73 formed as an integral extension of the outlet end piece 52.

It is possible to reconfigure the filter 10 of the embodiment shown in FIGS. 1 and 2 to operate in a reverse manner from the general flow path originally described. As an example, the inlet and outlet end pieces 17 and 18 could be reversed, the mounting of the check valve 33 inverted, and the basic flow path reversed such that pressurized flow of water from within the bottle would pass axially into the center of the tubular carbon filter element 14, radially outwardly therethrough, and axially along the outside surface of the filter element for discharge from the filter. In this modified embodiment, the check valve would be at the outlet end of the filter, rather than at the inlet end. However, this modified construction is less desirable from an efficiency standpoint because the effectiveness of a tubular cylindrical filter is enhanced by directing the flow radially inwardly through the element, rather than radially outwardly.

We claim:

1. A demountable filter for water contained in a bottle having a neck defining an open end and a flexible wall portion for manually pressurizing the water therein for dispensing, said filter comprising:

a filter housing having an enclosing outer wall, a raw water inlet on one end of the housing, and a filtered water outlet on the other end of the housing;

an annular cylindrical filter medium disposed within the filter housing and extending substantially the full length of said outer wall;

said inlet positioned to direct raw water in the bottle to an upstream surface of said filter medium and said outlet positioned to receive filtered water from a downstream surface of said filter medium for discharge;

said inlet, said filter medium and said outlet defining a water dispensing flow path;

a pressure equalization air passage including a portion of said flow path and having a portion of which lies outside said flow path, said air passage providing communication between the outlet and the bottle interior;

a check valve positioned in the portion of said air passage outside said flow path and operative in response to manual pressurization to prevent flow through said air passage and in response to release of said pressurization to permit a flow of outside air through said air passage; and means for demountably attaching the filter housing to the neck of the bottle, wherein said filter medium comprises a bed of particulate material, which is confined between said outer wall and an inner wall concentric with and spaced radially inwardly of said outer wall, said inlet includes a solid porous inlet retainer for the particulate material positioned in the raw water inlet at one axial end of the bed, and a solid porous intermediate retainer for said particulate material positioned in the bed outlet at the opposite axial end of said bed to define an axial flow path through said bed, and wherein said filter medium further comprises a porous tubular carbon block concentric with and spaced radially inwardly of said inner wall and defining therewith a flow distribution chamber having a chamber inlet on one axial end in communication with the flow from said intermediate retainer, said distribution chamber defining the upstream end of a radial flow path through said carbon block.

2. The filter as set forth in claim 1 wherein said attaching means comprises threaded connector means on the inlet to the housing for attachment to the neck of the bottle to mount the housing externally thereof.

3. The filter as set forth in claim 2 comprising a demountable closure cap on the outlet from the housing.

\* \* \* \* \*